Patented May 31, 1938

2,119,116

UNITED STATES PATENT OFFICE 2,119,116

TREATMENT OF CELLULOSE ESTERS

Aladar Schuller, Remi-Gustaaf Tritsmans, and Sergius Hendricx, Anvers, Belgium, assignors to Gevaert Photo-Producten, N. V., Anvers, Belgium No Drawing. Application September 29, 1936, Serial No. 103,148. In Austria October 2, 1935

6 Claims. (Cl. 260—102)

Our invention relates to cellulose esters and more especially to means whereby such esters are rendered stable.

As is well known to those skilled in the art, the esters of cellulose which are produced in the presence of mineral acids or of catalysts containing such acids are unstable owing to the presence therein of residual acid or catalysts and, owing to their unstability, are less fit for use than the cellulose esters which are free from such admixtures. The lack of stability of these esters is due to the fact that the mineral acids, when set free gradually, exert a saponifying action on the ester and cause decomposition of the cellulose.

It is therefore desirable to get rid of the residual mineral acids which may still be present in the cellulose esters, in order to obtain stable products.

It is an object of our invention to provide means, whereby this stabilization of cellulose esters can be attained in an easy and efficient manner.

We have found that if a cellulose ester produced in the presence of a mineral acid is treated in a two stage process first at a temperature above normal and preferably within the range of about 70 to 100° C., with a highly diluted solution containing about 0.1 to 1.0 per cent of an inorganic or an organic acid or a mixture of such acids, this treatment with acids being followed after removal of the acid solution, by an additional treatment with an inorganic and/or organic liquid in the presence of a small proportion of an agent having an alkaline reaction, high stability of the cellulose compounds is obtained.

This result could not be foreseen, since neither the action of acids nor the action of alkaline agents will bring about the same result. We have found that stability can be obtained only if the treatment with an acid is followed by a treatment with an alkaline agent.

In the actual practice of our invention we prefer acting on the ester with an acid at a temperature ranging between 70 and 100° C.

Our process offers the particular advantage of allowing the acids as well as the agents of alkaline reaction to be employed in aqueous solution, whereby the process is rendered particularly economical, the more so since the acids as well as the alkaline agents can be applied in a high state of dilution. If, in the second stage of our process, volatile agents of alkaline action are used in solution in a volatile organic solvent, for instance ammonia in alcoholic solution, the stabilized product can be dried quickly.

We have further found that the treatment with alkaline agents need not be carried through at an elevated temperature, but also at a moderate or at ordinary temperature, whereby the economy of the process is further improved.

As inorganic acids adapted for use in the first stage of our process we may use sulfuric acid, hydrochloric acid, phosphoric acid, perchloric acid etc., and of the organic acids besides acetic acid also formic acid, propionic acid, citric acid and oxalic acid. These acids are applied in highly diluted, in most cases in aqueous solutions, containing less than 1% and as a rule about 0.1% acid.

The agents of alkaline reaction used in the second stage of our process may be ammonia or an amine, for instance dimethylamine, or a compound such as the hydroxide, carbonate or the like, of an alkali metal, for instance a carbonate of potash, lithium or sodium, which may be dissolved in water or in a volatile organic solvent, for instance alcohol.

In practicing our invention we may for instance proceed as follows:

Example 1

The solid primary cellulose acetate (triacetate) prepared by entering 100 parts by weight cotton linters in a mixture of 1000 parts acetic anhydride and 1000 parts benzene, adding, after 24 hours, one part sulfuric acid and acetylating during 24 hours at 35° C., is entered in a 0.1% aqueous solution of acetic acid, heated to about 90 to 100° C. After the lapse of 10 hours the liquid is separated by centrifuging and washing and the solid product treated during another 10 hours with a 0.5% solution of ammonia in ethyl alcohol, the temperature being kept at about 40° C.

After having gone through this treatment, the cellulose acetate will be found to possess a high degree of stability.

Example 2

100 parts cotton linters are introduced into a mixture of 600 parts acetic anhydride, 400 parts propionic anhydride and 1000 parts benzene. The mixture is kept 24 hours at 20° C. and one part sulfuric acid is then added, whereupon acetylation is effected during further 24 hours at 30° C. The solid mixed ester thus obtained is treated 6 hours at about 80° C. with a 0.1% aqueous solution of sulfuric acid, whereupon the liquid is removed by centrifuging and washing and the solid ester treated 10 hours at room temperature with a 0.1% aqueous solution of carbonate of potash. The product possesses a high stability.

*Example 3*

100 parts cellulose are introduced into a mixture of 400 parts acetic acid, 300 parts acetic anhydride and 15 parts sulfuric acid kept at a temperature of about 5° C. By cooling the mixture we provide that the temperature does not rise above 25° C. After the cellulose has dissolved, dilute acetic acid is added and the mixture allowed to age at 50° C. until the product has become soluble in acetone, whereupon the diacetate is precipitated with water. The solid diacetate is now heated 10 hours to about 70 to 80° C. in a solution of 1 kg. acetic acid and 1 kg. sulfuric acid in 1000 litres water. The product separated from the liquid is then washed and treated 5 hours at about 70 to 80° C. with a 0.5% aqueous solution of dimethylamine. The diacetate thus treated has been found to possess a high degree of stability.

It is particularly surprising that organic esters of cellulose such as mentioned above could be treated with acids and alkalies in succession, since one would have expected that such a combined treatment would cause the organic esters to be decomposed.

Various changes may be made in the details disclosed in the foregoing specification without departing from the invention or sacrificing the advantages thereof.

We claim:—

1. The process of rendering cellulose esters of organic acids stable which comprises treating the solid ester in a two stage process first at a temperature ranging between 70 and 100° C. with an aqueous solution containing about 0.1 to 1% of an acid and after removal of the acid at a temperature not exceeding 80° C. with a substance of alkaline reaction in the presence of a liquid the proportion of the substance to the said liquid being about 0.1–1.0 to 100.

2. The process of rendering cellulose esters of organic acids stable which comprises treating the solid ester in a two stage process first at a temperature ranging between 70 and 100° C. with an aqueous solution containing about 0.1 to 1% of an acid and after removal of the acid with a substance of alkaline reaction dissolved in a solvent in the proportion of about 0.1–1.0 to 100.

3. The process of rendering cellulose esters of organic acids stable which comprises treating the solid ester in a two stage process first at a temperature ranging between 70 and 100° C. with an aqueous solution containing about 0.1 to 1% of an acid and after removal of the acid with a solution of a substance of alkaline reaction in a volatile organic solvent in the proportion of about 0.1–1.0 to 100.

4. The process of rendering cellulose esters of organic acids stable which comprises treating the solid ester in a two stage process at a temperature ranging between 50 and 100° C. with a solution containing about 0.1 to 1% of an inorganic acid and after removal of the acid at a temperature not exceeding 80° C. with a solution containing about 0.1 to 1% of a substance of alkaline action.

5. The process of rendering cellulose esters of organic acids stable which comprises treating the solid ester in a two stage process at a temperature ranging between 70 and 100° C. with a solution containing about 0.1 to 1% of an organic acid and after removal of the acid at a temperature not exceeding 80° C. with a solution containing about 0.1 to 1% of a substance of alkaline action.

6. The process of rendering cellulose esters of organic acids stable which comprises treating the solid ester in a two stage process at a temperature ranging between 70 and 100° C. with a solution containing about 0.1 to 1% of an inorganic and an organic acid and after removal of the acid at a moderate temperature with a highly diluted solution of a substance of alkaline action.

ALADAR SCHULLER.
REMI-GUSTAAF TRITSMANS.
SERGIUS HENDRICX.